United States Patent
Gwalani et al.

(10) Patent No.: US 9,621,403 B1
(45) Date of Patent: Apr. 11, 2017

(54) INSTALLING NETWORK CERTIFICATES ON A CLIENT COMPUTING DEVICE

(75) Inventors: Sumit Gwalani, Sunnyvale, CA (US); Kenneth Edward Mixter, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 376 days.

(21) Appl. No.: 13/412,552

(22) Filed: Mar. 5, 2012

(51) Int. Cl.
*G06F 15/173* (2006.01)
*H04L 29/08* (2006.01)
*H04L 29/06* (2006.01)

(52) U.S. Cl.
CPC ........ *H04L 29/08144* (2013.01); *H04L 29/06* (2013.01)

(58) Field of Classification Search
CPC . H04L 9/3263; H04L 63/0823; H04L 9/3268; H04L 9/3265; H04L 29/06775; H04L 2209/38; H04L 2209/64; G06F 2/335; H04H 60/02
USPC .......................................................... 709/226
See application file for complete search history.

(56) References Cited

U.S. PATENT DOCUMENTS

| | | | | |
|---|---|---|---|---|
| 6,393,563 B1 * | 5/2002 | Maruyama | ............... | G06F 21/64 380/255 |
| 7,103,572 B1 * | 9/2006 | Kawaguchi | ............ | G06Q 20/04 705/39 |
| 7,185,363 B1 * | 2/2007 | Narin | ....................... | G06F 21/10 726/18 |
| 7,922,080 B1 * | 4/2011 | Doland | ................. | G07F 19/206 235/379 |
| 8,108,670 B2 * | 1/2012 | Morgan | ............... | H04L 63/062 713/158 |
| 8,578,363 B2 * | 11/2013 | Sah | .......................... | G06F 8/65 717/169 |
| 2001/0051996 A1 * | 12/2001 | Cooper | .................. | G06Q 10/10 709/217 |
| 2002/0146125 A1 * | 10/2002 | Eskicioglu | ............ | H04L 9/0825 380/255 |
| 2002/0152173 A1 * | 10/2002 | Rudd | .................. | G06F 21/6209 705/57 |
| 2002/0157002 A1 * | 10/2002 | Messerges | .............. | G06F 21/10 713/155 |

(Continued)

*Primary Examiner* — Glenton B Burgess
*Assistant Examiner* — Tariq Najee-Ullah
(74) *Attorney, Agent, or Firm* — McDermott Will & Emery LLP (57) ABSTRACT

Systems and methods for installing network certificates on a client computing device are provided. In some aspects, a method includes automatically determining that the certificate associated with the network is not installed on the computing device. The method also includes determining that the certificate can be installed on the computing device without assistance. The method also includes determining whether end-user input is required to install the certificate. The method also includes, if end-user input is required to install the certificate, displaying a graphical component which prompts an end-user for an input associated with generating the certificate, receiving the input, and providing a request to generate the certificate based on the input. The method also includes, if end-user input is not required to install the certificate, providing a request to generate the certificate. The method also includes storing the certificate. The method also includes connecting to the network using the certificate.

30 Claims, 5 Drawing Sheets

(56) References Cited

U.S. PATENT DOCUMENTS

| | | | |
|---|---|---|---|
| 2003/0126432 A1* | 7/2003 | Tonisson | 713/156 |
| 2003/0182549 A1* | 9/2003 | Hallin | G06F 21/33 713/156 |
| 2004/0054907 A1* | 3/2004 | Chateau | G06F 21/10 713/175 |
| 2004/0230800 A1* | 11/2004 | Futa et al. | 713/169 |
| 2005/0120214 A1* | 6/2005 | Yeates | H04L 63/08 713/171 |
| 2005/0132209 A1* | 6/2005 | Hug | G06F 21/10 713/189 |
| 2005/0228986 A1* | 10/2005 | Fukasawa et al. | 713/156 |
| 2006/0143251 A1* | 6/2006 | Peterson et al. | 707/204 |
| 2007/0083751 A1* | 4/2007 | Yami et al. | 713/156 |
| 2007/0204153 A1* | 8/2007 | Tome et al. | 713/164 |
| 2007/0204166 A1* | 8/2007 | Tome et al. | 713/182 |
| 2007/0208943 A1* | 9/2007 | Gupta et al. | 713/176 |
| 2007/0245414 A1* | 10/2007 | Chan | H04L 63/0823 726/12 |
| 2007/0277248 A1* | 11/2007 | Agrawal | G06F 8/60 726/30 |
| 2008/0010450 A1* | 1/2008 | Holtzman | H04L 9/3228 713/157 |
| 2008/0022104 A1* | 1/2008 | Deishi | 713/175 |
| 2009/0086977 A1* | 4/2009 | Berggren | 380/279 |
| 2009/0126001 A1* | 5/2009 | Krantz | G06F 21/33 726/10 |
| 2009/0177585 A1* | 7/2009 | Eskicioglu | G06Q 20/3674 705/67 |
| 2009/0228703 A1* | 9/2009 | Grajek | H04L 9/3268 713/156 |
| 2009/0327634 A1* | 12/2009 | Bovee | 711/163 |
| 2010/0023757 A1* | 1/2010 | Nguyen-Huu | H04L 12/58 713/156 |
| 2010/0281522 A1* | 11/2010 | Hatakeyama | G06F 21/33 726/4 |
| 2010/0313259 A1* | 12/2010 | Fries et al. | 726/10 |
| 2011/0213961 A1* | 9/2011 | Wnuk et al. | 713/156 |
| 2012/0173682 A1* | 7/2012 | Mantere et al. | 709/221 |
| 2012/0233679 A1* | 9/2012 | Shedrinsky | 726/7 |
| 2012/0246475 A1* | 9/2012 | Yoo et al. | 713/168 |
| 2012/0290833 A1* | 11/2012 | Clegg et al. | 713/156 |
| 2013/0007868 A1* | 1/2013 | Hoggan | H04L 9/3263 726/8 |

* cited by examiner

INSTALLING NETWORK CERTIFICATES ON A CLIENT COMPUTING DEVICE

FIELD

The subject technology generally relates to network management and, in particular, relates to installing network certificates on a client computing device.

BACKGROUND

Many client computing devices, including laptop computers, desktop computers, mobile phones, tablet computers, and personal digital assistants (PDAs) may connect to enterprise or home networks. Oftentimes, such networks require that certificates be installed on devices connected to the networks in order to ensure the security of the networks or to identify end-users of the network. However, installing certificates on client computing devices is challenging because end-users may not know where to obtain or how to install the certificates. As a result, end-users may need to contact an administrator by telephone or bring the client computing device to the administrator in order to install the certificates, taking up both their own time and that of the administrator. As the foregoing illustrates, an approach to installing network certificates on a client computing device that is friendly to the end-user and that minimizes the involvement of the administrator may be desirable.

SUMMARY

The disclosed subject matter relates to a computer-implemented method for installing a certificate associated with a network on a computing device. The method includes automatically determining that the certificate associated with the network is not installed on the computing device. The method also includes determining that the certificate can be installed on the computing device without assistance. The method also includes determining whether end-user input is required to install the certificate. If end-user input is required to install the certificate, the method also includes displaying a graphical component which prompts an end-user for an input associated with generating the certificate, receiving the input, and providing a request to generate the certificate based on the input If end-user input is not required to generate the certificate, the method includes providing a request to generate the certificate. The method also includes storing the certificate. The method also includes connecting to the network using the certificate.

The disclosed subject matter also relates to a computer-implemented method for installing a certificate associated with a network on a computing device. The method includes receiving, from the computing device, a request for the certificate to connect to the network. The method also includes receiving an additional input associated with the request for the certificate to connect to the network or a confirmation that the certificate is to be generated. The method also includes verifying the additional input or the confirmation. The method also includes generating the certificate based on the additional input or the confirmation. The certificate identifies the computing device. The method also includes transmitting the certificate to the computing device.

The disclosed subject matter further relates to a computer-readable medium. The computer-readable medium includes instructions that, when executed by a computer, cause the computer to implement a method for installing network certificates on a client computing device. The instructions include code for automatically determining that a certificate associated with the network is not installed on a computing device. The instructions also include code for determining whether the certificate can be installed on the computing device without assistance. The instructions also include code for, if the certificate can be installed on the computing device without assistance, displaying a first graphical component that prompts an end-user for an input associated with generating the certificate or a confirmation that the certificate is to be generated, receiving the input or the confirmation, and providing a request to generate the certificate based on the input or the confirmation. The instructions also include code for, if the certificate cannot be installed on the computing device without assistance, displaying a second graphical component that instructs the end-user to manually install the certificate or obtain human assistance with installing the certificate. The instructions also include code for storing the certificate. The instructions also include code for providing the certificate in response to a request to connect to the network.

The disclosed subject matter further relates to a computing device. The computing device includes one or more processors. The computing device also includes a memory that includes instructions that, when executed by the one or more processors, cause the one or more processors to implement a method for installing network certificates on a client computing device. The instructions include code for automatically determining that a certificate associated with a network is not installed on the computing device. The instructions also include code for displaying a graphical component which prompts an end-user for an input associated with generating the certificate. The instructions also include code for receiving the input. The instructions also include code for providing a request to generate the certificate based on the input. The instructions also include code for storing the certificate. The instructions also include code for providing the certificate in response to a request to connect to the network.

The disclosed subject matter further relates to a computer-implemented method for connecting to a network. The method includes receiving indicia of a set of available networks. The method also includes receiving, for each network in a subset of the set of available networks, an input indicating a set of certificates required to connect to the network and a certificate-obtaining application associated with the network for launching if at least one certificate in the set of certificates is not available. The method also includes receiving a request to connect to a specified network in the subset of the set of available networks. The method also includes determining whether the set of certificates required to connect to the specified network is available. The method also includes, if the set of certificates required to connect to the to the specified network is available, connecting to the specified network with the set of certificates required to connect to the to the specified network. The method also includes, if the set of certificates required to connect to the specified network is not available, launching the certificate-obtaining application associated with the specified network.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is related to installing network certificates on a client computing device. A determination can be made that the certificate associated with the network is not installed on the computing device. The determination that the certificate associated with the network is not installed on the computing device may involve searching for the certificate in a certificate storage unit and determining that the certificate is not stored in the certificate storage unit based on the search. If the certificate cannot be installed on the client computing device without assistance, e.g., from an administrator or a technical support person, then a window may be displayed that instructs the end-user how he/she may obtain the certificate, e.g., by contacting an administrator or a technical support person via a certain telephone number or email address. Otherwise, a determination can be made that the certificate can be installed on the computing device without assistance. The determination that the certificate can be installed on the computing device without assistance may be based on one or more of an identifier associated with the network, login information of the end-user of the computing device, software associated with the computing device, or hardware associated with the computing device. A graphical component which prompts an end-user for an input associated with generating the certificate can be displayed. The graphical component may be a browser window, a browser tab, or a browser pop-up. The input associated with generating the certificate may include one or more of an end-user identifier, a password, permission to access antivirus program information, or permission to access a virus scan history. The input associated with generating the certificate can be received from the end-user. The certificate based on the input can be generated. For example, the client computing device may transmit the input to a server machine, which may generate the certificate and transmit the certificate to the client computing device. The certificate can be stored, for example, in a certificate storage unit. The certificate can be provided in response to a request to connect to the network.

Figure 1:
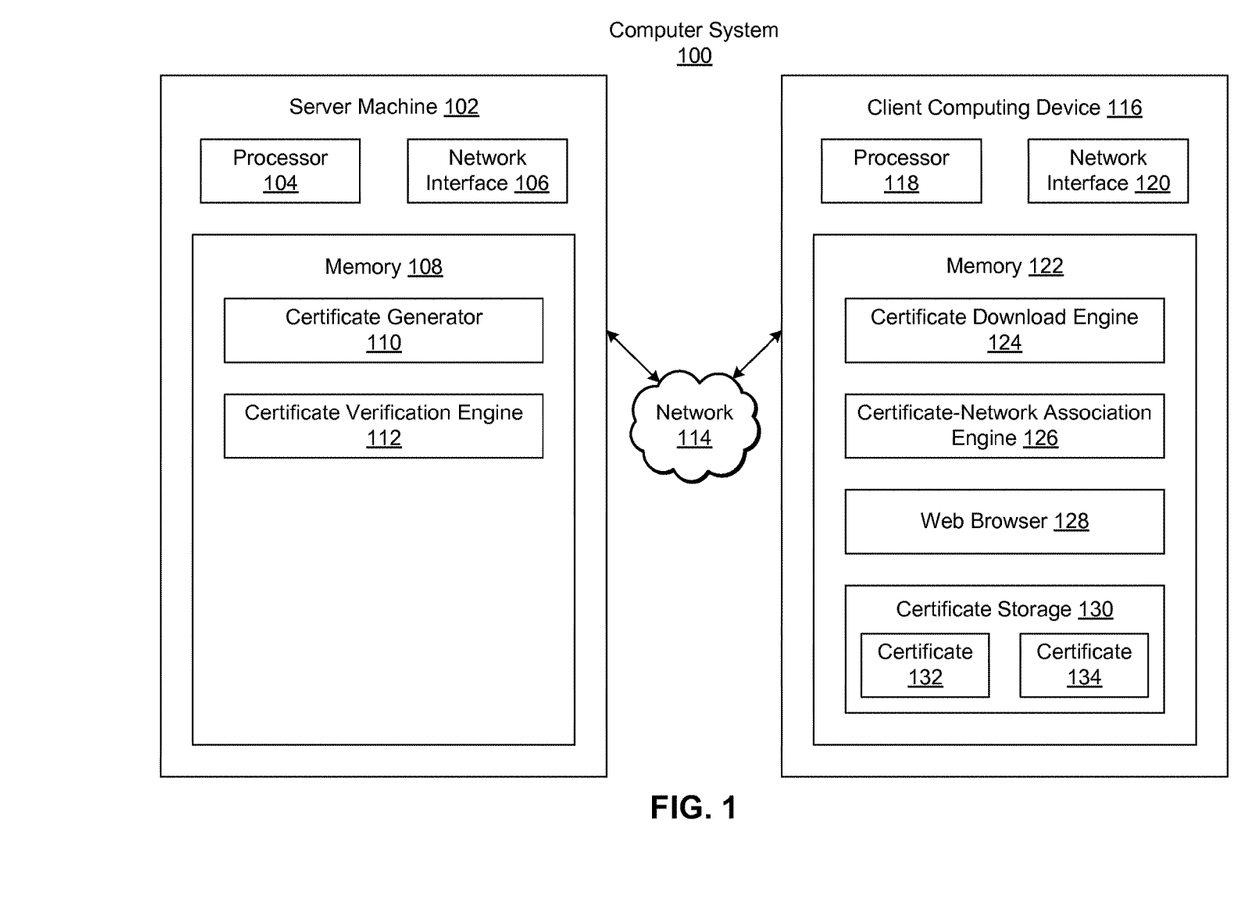
FIG. 1 illustrates an example of a computer system configured to implement installing network certificates on a client computing device.

FIG. 1 illustrates an example of a computer system 100 configured to implement installing network certificates on a client computing device.

As shown, the computer system 100 includes a server machine 102 and a client computing device 116 that are configured to communicate to one another over a network 114. The network 114 may be, for example, the Internet, an intranet, a wireless network, a wired network, or a cellular network. While only one server machine 102 and client computing device 116 are illustrated here, the techniques disclosed herein may be implemented with one or more server machines 102 or client computing devices 116.

The server machine 102 is configured to generate or verify the authenticity of network certificates. As illustrated here, the same server machine 102 generates and verifies network certificates. However, in one implementation, a first server machine may be configured to generate network certificates and a second server machine, different from the first server machine, may be configured to verify the authenticity of network certificates.

As shown, the server machine 102 includes a processor 104, a network interface 106, and a memory 108. The processor 104 is configured to execute computer instructions that are stored in a computer-readable medium, such as the memory 108. For example, the processor 104 may include a central processing unit (CPU). The network interface 106 is configured to allow the server machine 102 to transmit and receive data in the network. The network interface 106 may include one or more network interface cards (NICs). The memory 108 stores data and instructions. As illustrated, the memory 108 stores a certificate generator 110 and a certificate verification engine 112.

The certificate generator 110 is configured to receive, from a device, (e.g., client computing device 116) a request to connect to a network. The network to which the device is attempting to connect may be network 114 or another network. For example, network 114 connecting the device and the server machine 102 may be a WiFi network (e.g., at a university) and the device may request a certificate to connect to the network 114. Prior to receiving the certificate, the device may have permission to interact with the network 114 in order to communicate with the server machine 102 for the purpose of receiving a certificate, but the device may not have permission to access other network services. Alternatively, network 114 connecting the device and the server machine 102 may be a cellular network and the device may request a certificate to connect to a corporate intranet over the cellular network 114. The device may not have permission to access the corporate intranet at all prior to receiving the certificate. The certificate generator 110 may also receive an additional input associated with the request to connect to the network. The additional input may include one or more of an end-user identifier of an end-user of the device, a password of an end-user of the device, antivirus program information of the device, or a virus scan history of the device. However, other information may also be included in the additional input, for example, the additional input may further include a photograph of an end-user of the device. The certificate generator 110 may verify that the additional input is valid and generate a certificate based on the additional input for the device. The certificate generator 110 may transmit the generated certificate to the device, for example, in an encrypted form.

The certificate verification engine 112 is configured to receive a request to connect to a network and a certificate from a device, e.g., client computing device 116. The network to which the device is attempting to connect may be network 114 or another network. For example, network 114 connecting the device and the server machine 102 may be a WiFi network (e.g., at a university or a business) and the device may request a certificate to connect to the network 114. Prior to having the certificate verified by the certificate verification engine, the device may be able to access the network 114 to communicate with the server machine 102 in order to verify or obtain a certificate, but not to access other network services. Alternatively, network 114 connecting the device and the server machine 102 may be a cellular network and the device may request a certificate to connect to a different network, (e.g., a corporate intranet) over the cellular network 114. The certificate verification engine 112 may verify that the certificate is authentic. If the certificate is authentic, the certificate verification engine may allow the device to connect to the network. If the certificate is not authentic, the certificate verification engine may not allow the device to connect to the network or instruct the end-user of the device to obtain a certificate.

As illustrated, the certificate generator 110 and the certificate verification engine 112 reside on a single server machine 102. However, in other implementations, a first server machine may include the certificate generator 110 and a second server machine, different from the first server machine, may include the certificate verification engine 112. Furthermore, the subject technology may be implemented in conjunction with multiple server machines, a first subset of which includes a certificate generator 110 and a second subset of which includes a certificate verification engine. The first subset and the second subset may have an intersection, i.e., some server machines may include both the certificate generator 110 and the certificate verification engine 112, while other server machine may include only one of the certificate generator 110 and the certificate verification engine 112.

The client computing device 116 may be any computing device capable of connecting to a network and presenting information stored in the network to an end-user. The client computing device 116 may be a laptop computer, a desktop computer, a mobile phone, a personal digital assistant (PDA), a tablet computer, a netbook, a physical machine or a virtual machine. Other devices may also implement the functionalities of the client computing device 116. The client computing device 116 may include one or more of a keyboard, a mouse, a touch screen, or a display.

As shown, the client computing device 116 includes a processor 118, a network interface 120, and a memory 122. The processor 118 is configured to execute computer instructions that are stored in a computer-readable medium, such as the memory 122. For example, the processor 118 may include a central processing unit (CPU). The network interface 120 is configured to allow the client computing device 116 to transmit and receive data in the network. The network interface 120 may include one or more network interface cards (NICs). The memory 122 stores data and instructions. As illustrated, the memory 108 stores a certificate download engine 124, a certificate-network association engine 126, a web browser 128, and a certificate storage 130.

The certificate download engine 124 is configured to determine whether a certificate for a network to which an end-user of the client computing device wishes to connect can be installed on the client computing device 116 without assistance, e.g., from an administrator or a technical support person. If the certificate can be installed without assistance, then the certificate download engine 124 displays a graphical component that prompts the end-user for an input associated with generating the certificate. The input may include one or more of an end-user identifier, a password, permission to access antivirus program information, or permission to access a virus scan history. The certificate download engine 124 may then receive the input and transmit the input to the server machine 102, which may generate the certificate based on the input and transmit the certificate to the client computing device 116. If the certificate cannot be installed without assistance, then the certificate download engine 124 may display a graphical component that instructs the end-user to manually install the certificate. The graphical component may inform the end-user of the location and work hours of an administrator who may assist the end-user with installing the certificate. After receiving the certificate, the certificate download engine 124 may store the certificate in the certificate storage 130.

The certificate-network association engine 126 is configured to determine whether a certificate associated with a network to which the end-user of the client computing device 116 wishes to connect is stored in the certificate storage 130. If so, then the certificate-network association engine 126 may provide the certificate so that the client computing device 116 may connect to the network. If not, then the certificate-network association engine 126 may invoke the certificate download engine 124 to download a new certificate for the client computing device 116 to connect to the network.

The web browser 128 is configured to display web pages and related content on the client computing device 116. In one implementation, the web browser 128 includes one or more browser applications that implement the functions of the certificate download engine 124 or the certificate-network association engine 126. The graphical components generated by the certificate download engine 124 may include browser windows, browser tabs, or browser pop-ups. In one example, the graphical components include text or images that instruct a user how to obtain the certificate if the certificate cannot be downloaded without assistance, e.g., by telephoning or emailing an administrator or a technical support person.

The certificate storage 130 is configured to store a set of certificates 132 and 134. While two certificates 132 and 134 are illustrated, the subject technology may involve more or less than two certificates. Each certificate 132 or 134 may be associated with a network. The certificate storage 130 may be encrypted. The end-user of the client computing device 116 may be prevented from modifying the certificates 132 or 134 stored in the certificate storage 130 or from copying the certificates 132 or 134 to another computing device, resulting in network administrators having greater control over the device(s) that may connect to the network(s).

Figure 2:
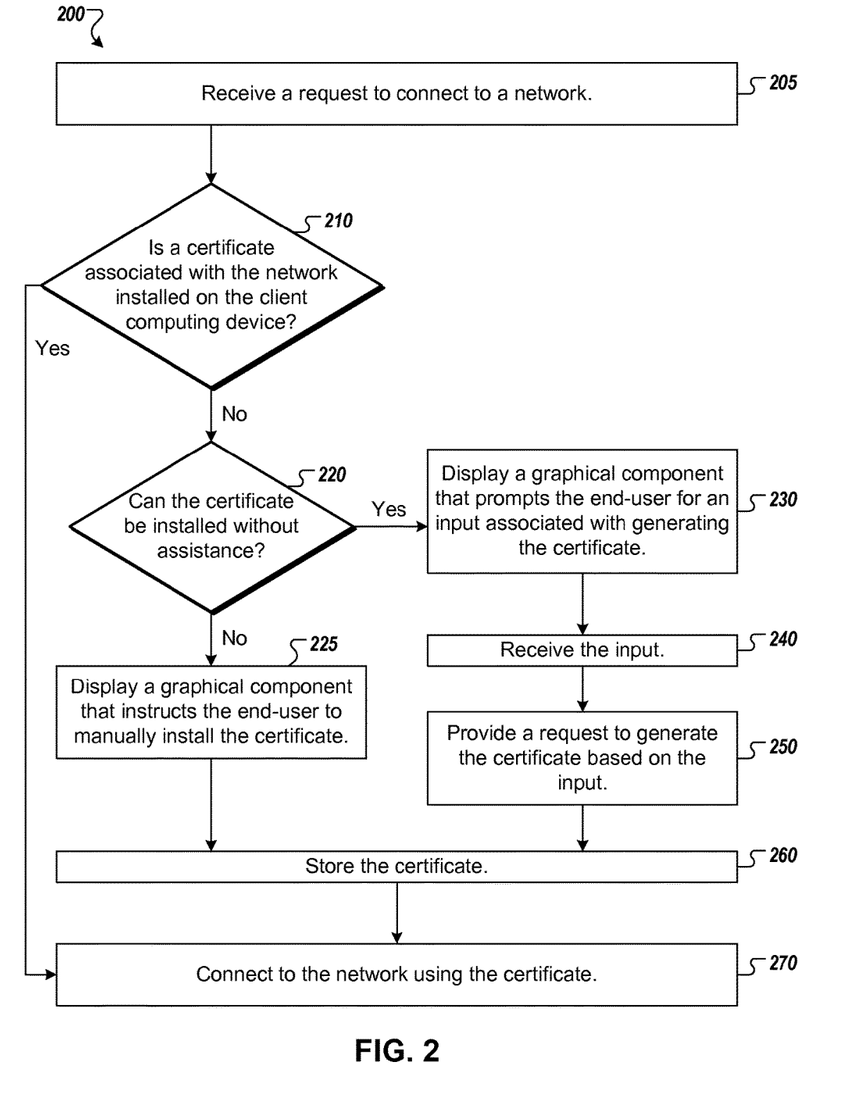
FIG. 2 illustrates an example process by which a network certificate may be installed on a client computing device.

FIG. 2 illustrates an example process 200 by which a network certificate may be installed on a client computing device.

The process 200 begins at step 205 where the client computing device receives a request to connect to a network.

The request may come from a user who enters a command, e.g., via a keyboard, a mouse, or a touch screen, to connect to a network.

According to step 210, the client computing device determines whether a certificate associated with a network is installed on the client computing device. The client computing device may determine whether the certificate associated with the network is installed on the client computing device by searching for the certificate associated with the network in the certificate storage and determining whether the certificate associated with the network is stored in the certificate storage based on the search for the certificate. If the certificate associated with the network is installed on the client computing device, then the process 200 continues to step 270, described below. However, if the certificate associated with the network is not installed on the client computing device, then the process 200 continues to step 220.

According to step 220, if the certificate associated with the network is not installed on the client computing device, the client computing device determines whether the certificate can be installed on the client computing device without assistance. The assistance may come from an administrator. The determination whether the certificate can be installed on the client computing device without assistance may be based on one or more of an identifier associated with the network, login information of the end-user of the client computing device, software associated with the client computing device, or hardware associated with the client computing device.

If the certificate cannot be installed without assistance, the process 200 continues to step 225 where the client computing device displays a graphical component that instructs the end-user of the client computing device to manually install the certificate. The graphical component may be associated with an application, such as browser. The graphical component may be a browser window, a browser tab, or a browser pop-up. The graphical component may specify the location, business hours or contact information (e.g., telephone number or email address) of an administrator or technical support person who may assist the end-user with installing the certificate. After step 225, the process 200 continues to step 260, described below.

If the certificate can be installed without assistance, the process 200 continues to step 230 where the client computing device displays a graphical component that prompts the end-user for an input associated with generating the certificate. The graphical component may be associated with an application, such as browser. In one implementation, the browser may store information necessary to generate the certificate and may automatically transmit the information to the server machine without requiring the end-user to re-enter the information. The browser may receive permission to transmit the information to the server machine from the end-user, and the end-user may opt-out of having his/her information automatically transmitted to the server machine. The graphical component may be a browser window, a browser tab, or a browser pop-up. The input associated with generating the certificate may include one or more of an end-user identifier, a password, permission to access antivirus program information, or permission to access a virus scan history. In one implementation, the client computing device may determine that an input may not be necessary, and the client computing device may provide the request to generate the certificate without the input. Alternatively, if the client computing device determines that an input is necessary, the input may include a confirmation that the end-user permits a certificate identifying the client computing device to be installed on the client computing device. The end-user may opt-out of having a certificate installed on the client computing device without the end-user's permission.

According to step 240, the client computing device receives the input associated with generating the certificate. The input may be entered by the end-user of the client computing device and transmitted to the server machine. In one implementation, an input may not be necessary and step 240 may be skipped.

According to step 250, the client computing device provides a request to generate the certificate based on the input. The input may be a confirmation that the end-user of the client computing device permits a certificate to be installed on the client computing device. The input may include additional information, for example, a username and a password identifying the end-user or an account associated with the end-user. The request may be provided to the server machine. The certificate may be generated by the server machine and transmitted to the client computing device. The server machine may encrypt the certificate and transmit the encrypted certificate to the client computing device. The encrypted certificate may be transmitted via a network to which the client computing device is already connected or via a network to which the client computing device is attempting to connect.

According to step 260, the client computing device stores the certificate. The certificate may be stored in a certificate storage on the client computing device. The certificate storage may be encrypted to prevent unauthorized access to or tampering with certificates stored on the client computing device.

According to step 270, the client computing device connects to the network using the certificate. The client computing device may provide the certificate in response to the request to connect to the network. The client computing device may provide the certificate by searching for the certificate associated with the network in the certificate storage and finding the certificate associated with the network in the certificate storage based on the search. After step 270, the process 200 ends.

Figure 3:
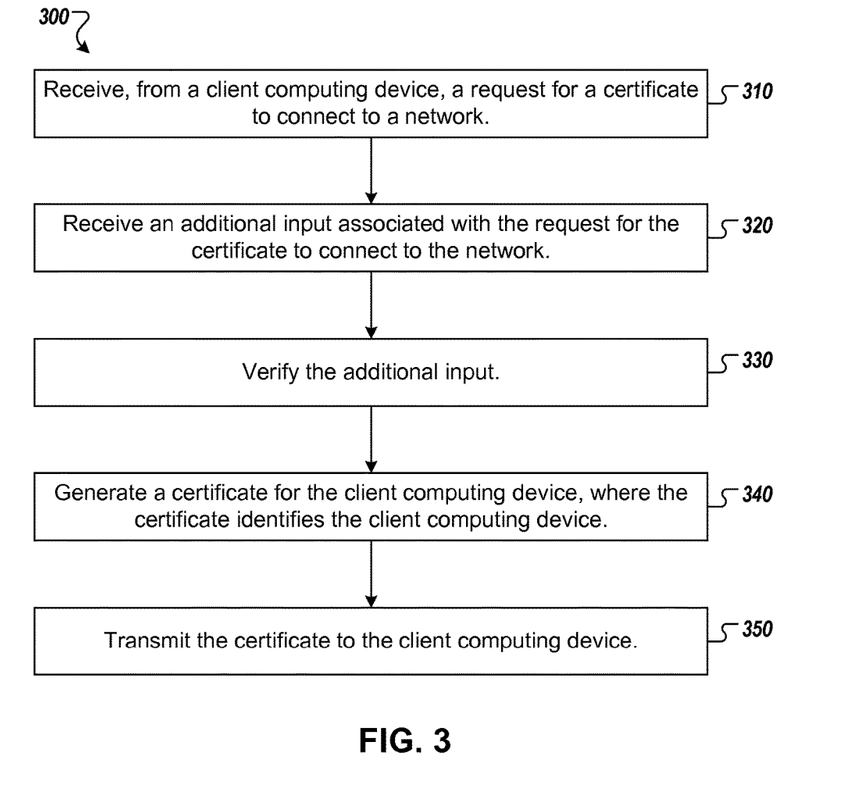
FIG. 3 illustrates an example process by which a network certificate may be generated for a client computing device.

FIG. 3 illustrates an example process 300 by which a network certificate may be generated for a client computing device.

The process 300 begins at step 310 where the server machine receives, from the client computing device, a request for a certificate to connect to a network. The request may include an identification of the client computing device, such as an identifier of the client computing device. The network may be, for example, an intranet, a wired network, a wireless network, or any other known network. Step 310 may be implemented either via the server machine (e.g., server machine 102) or via a client computing device (e.g., client computing device 116).

According to step 320, the server machine receives an additional input associated with the request for the certificate to connect to the network. The additional input may include one or more of an end-user identifier of an end-user of the client computing device, a password of an end-user of the client computing device, antivirus program information of the client computing device, or a virus scan history of the client computing device. Alternatively, the additional input may include a confirmation that the end-user of the client computing device permits a certificate to be installed on the client computing device. In one implementation, an additional input may not be required. However, the end-user of the client computing device may opt out of having any certificates installed on the client computing device without the end-user's affirmative permission.

According to step 330, the server machine verifies the additional input. The server machine may verify that the additional input matches a value stored in a database. For example, username/password pair in the additional input may match a username/password pair stored in a database. In one implementation, the additional input may be a confirmation that the end-user permits a certificate to be installed on the client computing device. In an alternative implementation, there may be no additional input. However, the end-user of the client computing device may opt out of having any certificates installed on the client computing device without the end-user's affirmative permission.

According to step 340, the server machine generates a certificate for the client computing device. The certificate may identify the client computing device and allow the client computing device to connect to the network.

According to step 350, the server machine transmits the certificate to the client computing device. In one implementation, the server machine may encrypt the certificate and transmit the encrypted certificate to the client computing device. The encrypted certificate may be transmitted via a network to which the client computing device is already connected or via a network to which the client computing device is attempting to connect. In the latter case, the client computing device may be provided a limited interface with the network to download the certificate before the certificate is installed.

Figure 4:
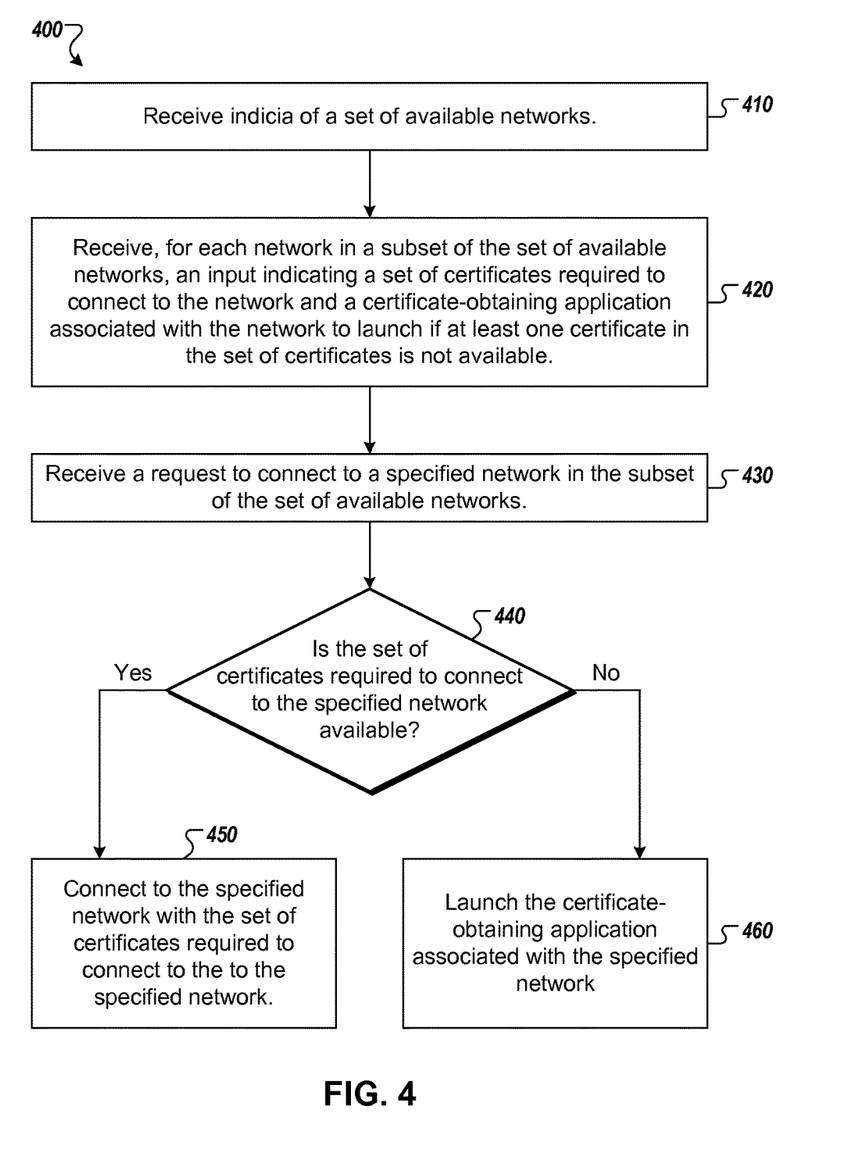
FIG. 4 illustrates an example process by which a client computing device may connect to a network.

FIG. 4 illustrates an example process 400 by which a client computing device may connect to a network.

The process 400 begins at step 410, where the client computing device receives indicia of a set of available networks, e.g., one or more networks to which the client computing device may connect from the present location of the current computing device. The set of networks may include, for example, at least one WiFi network or at least one virtual private network (VPN).

In step 420, the client computing device receives, for each network in a subset of the set of available networks, an input indicating a set of certificates required to connect to the network and a certificate-obtaining application associated with the network for launching if at least one certificate in the set of certificates is not available. The subset of the set of available networks may include, for example, at least one WiFi network or at least one VPN. The client computing device may receive the input from a single centralized server machine (e.g., server machine 102), from a plurality of centralized server machines, or from a server farm.

In step 430, the client computing device receives a request to connect to a specified network in the subset of the set of available networks. For example, a user of the client computing device may enter an input to connect to the specified network, e.g., by selecting, e.g., with a mouse, a region of a display associated with the specified network.

In step 440, the client computing device determines whether the set of certificates required to connect to the specified network is available. If the set of certificates required to connect to the specified network is available, the process 400 continues to step 450. If the set of certificates required to connect to the specified network is not available, the process 400 continues to step 460.

In step 450, if the set of certificates required to connect to the specified network is available, the client computing device generates a service request for an administrator to provide the set of certificates required to connect to the specified network. After step 450, the process 400 ends.

In step 460, if the set of certificates required to connect to the specified network is not available, the client computing device launches the certificate-obtaining application associated with the specified network. The client computing device may execute the instructions stored within the certificate-obtaining application. In one implementation, the certificate obtaining application may include instructions for automatically obtaining set of certificates required to connect to the to the specified network via the certificate-obtaining application associated with the specified network, and connecting to the specified network with the set of certificates required to connect to the to the specified network. In another implementation, the certificate-obtaining application may include instructions for generating a service request for an administrator to provide the set of certificates required to connect to the specified network. In yet another implementation, the certificate-obtaining application may include instructions for providing a graphical user-interface element prompting a user to contact an administrator for assistance in obtaining the set of certificates required to connect to the specified network. The graphical user-interface element may specify the location, the business hours, the telephone number, or the email address of the administrator. After step 460, the process 400 ends.

Figure 5:
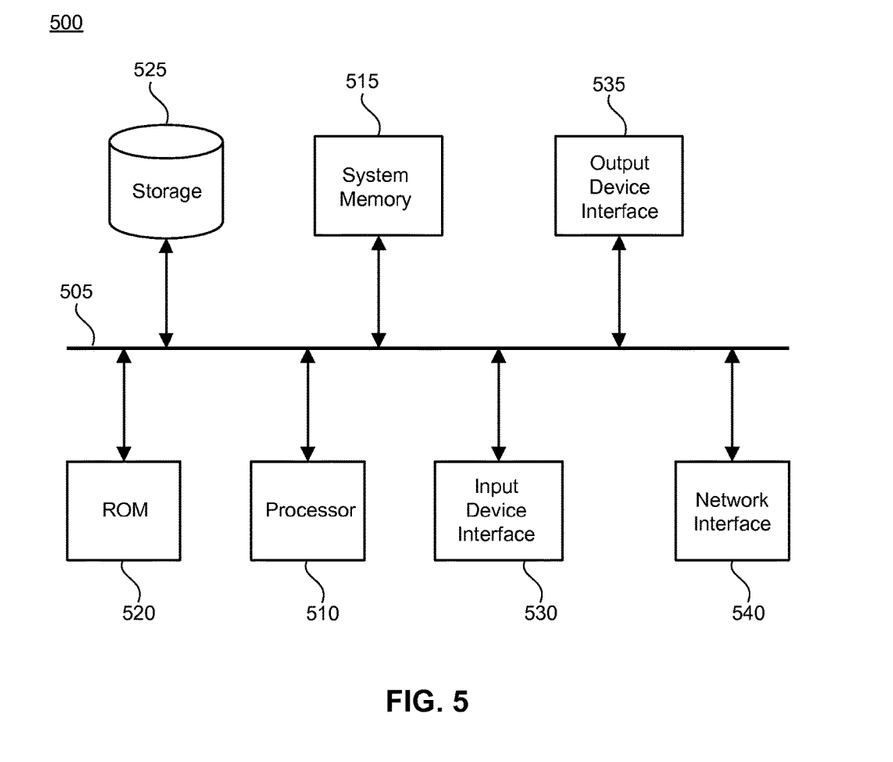
FIG. 5 conceptually illustrates an example of an electronic system with which some implementations of the subject technology are implemented.

FIG. 5 conceptually illustrates an example of an electronic system 500 with which some implementations of the subject technology are implemented. For example, the server machine 102 or the client computing device 116 may be implemented using the arrangement of the electronic system 500. The electronic system 500 can be a computer (e.g., a mobile phone, PDA), or any other sort of electronic device. Such an electronic system includes various types of computer readable media and interfaces for various other types of computer readable media. Electronic system 500 includes a bus 505, processing unit(s) 510, a system memory 515, a read-only memory 520, a permanent storage device 525, an input device interface 530, an output device interface 535, and a network interface 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525.

From these various memory units, the processing unit(s) 510 retrieves instructions to execute and data to process in order to execute the processes of the subject technology. The processing unit(s) can be a single processor or a multi-core processor in different implementations.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some implementations of the subject technology use a mass-storage device (for example a magnetic or optical disk and its corresponding disk drive) as the permanent storage device 525.

Other implementations use a removable storage device (for example a floppy disk, flash drive, and its corresponding disk drive) as the permanent storage device 525. Like the permanent storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the processes of the subject technology are stored in the system memory 515, the permanent storage device 525, or the read-only memory 520. For example, the various memory units include instructions for installing network certificates on a client computing device in accordance with some implementations. From these various memory units, the processing unit(s) 510 retrieves instructions to execute and data to process in order to execute the processes of some implementations.

The bus 505 also connects to the input and output device interfaces 530 and 535. The input device interface 530 enables the user to communicate information and select commands to the electronic system. Input devices used with input device interface 530 include, for example, alphanumeric keyboards and pointing devices (also called "cursor control devices"). Output device interfaces 535 enables, for example, the display of images generated by the electronic system 500. Output devices used with output device interface 535 include, for example, printers and display devices, for example cathode ray tubes (CRT) or liquid crystal displays (LCD). Some implementations include devices for example a touchscreen that functions as both input and output devices.

Finally, as shown in FIG. 5, bus 505 also couples electronic system 500 to a network (not shown) through a network interface 540. In this manner, the electronic system 500 can be a part of a network of computers (for example a local area network ("LAN"), a wide area network ("WAN"), or an Intranet, or a network of networks, for example the Internet. Any or all components of electronic system 500 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase for example an "aspect" does not imply that the aspect is essential to the subject technology or that the aspect applies to all configurations of the subject technology. A disclosure relating to an aspect may apply to all configurations, or one or more configurations. A phrase for example an aspect may refer to one or more aspects and vice versa. A phrase for example a "configuration" does not imply that such configuration is essential to the subject technology or that such configuration applies to all configurations of the subject technology. A disclosure relating to a configuration may apply to all configurations, or one or more configurations. A phrase for example a configuration may refer to one or more configurations and vice versa.

What is claimed is:

1. A computer-implemented method comprising:
   receiving, by a computing device, a request from an end-user to connect to a network;
   determining that a certificate associated with the network is not installed on the computing device;
   determining whether end-user input is required to install the certificate based at least in part on whether the end-user previously provided an input associated with the certificate prior to the request being received;
   responsive to determining that the end-user input is required to install the certificate:
     displaying a graphical component which prompts the end-user for an input associated with generating the certificate,
     receiving the input, and
     providing, over the network, a request to generate the certificate responsive to receiving the request from the end-user to connect to the network, the request to generate the certificate being based on the input; and
   responsive to determining that the end-user input is not required to install the certificate:
     providing, over the network, the request to generate the certificate, the request to generate the certificate being based at least in part on the input previously provided by the end-user;
   receiving, over the network, the certificate;
   storing the certificate in a certificate storage block for storing a plurality of certificates of the computing device, wherein the end-user of the computing device is prevented from modifying the plurality of certificates stored in the certificate storage block, and wherein the end-user of the computing device is prevented from copying the plurality of certificates stored in the certificate storage block to another computing device; and
   connecting to the network using the certificate.

2. The method of claim 1, further comprising:
   determining that the certificate cannot be installed on the computing device without assistance; and
   displaying a graphical component that instructs the end-user to manually install the certificate.

3. The method of claim 1, further comprising:
   determining that the certificate associated with the network is installed on the computing device; and
   connecting to the network using the certificate installed on the computing device.

4. The method of claim 1, wherein the graphical component is associated with an application.

5. The method of claim 4, wherein the application is a browser.

6. The method of claim 1, wherein determining whether the end-user input is required to install the certificate on the computing device is based on one or more of an identifier associated with the network, login information of the end-user of the computing device, software associated with the computing device, or hardware associated with the computing device.

7. The method of claim 1, wherein the input is included in the request to generate the certificate and the input comprises one or more of an end-user identifier or a password.

8. The method of claim 1, wherein the storing the certificate comprises storing the certificate in a certificate storage unit on the computing device.

9. The method of claim 8, wherein the certificate storage unit is encrypted.

10. The method of claim 8, wherein the determining that the certificate associated with the network is not installed on the computing device comprises:
   searching for the certificate associated with the network in the certificate storage unit; and
   determining that the certificate associated with the network is not stored in the certificate storage unit based on the searching for the certificate.

11. The method of claim 8, wherein the connecting to the network using the certificate comprises:
   searching for the certificate associated with the network in the certificate storage unit;
   finding the certificate associated with the network in the certificate storage unit based on the searching for the certificate; and
   providing the certificate in response to the request to connect to the network.

12. The method of claim 1, wherein determining whether the end-user input is required to install the certificate further comprises determining whether the end-user input is required to install the certificate based at least in part on whether the end-user previously provided the input associated with the certificate prior to the request being received and whether the end-user opted out of having the certificate installed without the end-user input.

13. A computer-implemented method for installing a certificate associated with a network on a computing device, the method comprising:
   receiving, from the computing device, a request for the certificate to connect to the network;
   determining that an additional end-user input is required for generating the certificate based at least in part on a user setting;
   signaling for a graphical component which prompts an end-user for the additional end-user input required for generating the certificate to be displayed at the computing device;
   receiving, from the computing device, the additional end-user input associated with the request for the certificate to connect to the network;
   verifying the additional end-user input;
   generating the certificate based on the additional end-user input, wherein the certificate identifies the computing device;
   encrypting the certificate; and
   transmitting the encrypted certificate to the computing device for storage of the certificate in a certificate storage block of the computing device, wherein the certificate storage block is for storing a plurality of certificates of the computing device, wherein the end-user of the computing device is prevented from modifying the plurality of certificates stored in the certificate storage block, and wherein the end-user of the computing device is prevented from copying the plurality of certificates stored in the certificate storage block to another computing device.

14. The method of claim 13, wherein the additional end-user input associated with the request to connect to the network includes an identification of the computing device.

15. The method of claim 14, wherein the additional end-user input associated with the request to connect to the network comprises one or more of an end-user identifier of the end-user of the computing device, a password of the end-user of the computing device, antivirus program information of the computing device, or a virus scan history of the computing device.

16. A computer-readable medium comprising instructions that, when executed by a computer, cause the computer to:
   determine that a certificate associated with a network is not installed on a computing device;
   determine whether the certificate can be installed on the computing device without assistance;
   responsive to a determination that the certificate can be installed on the computing device without assistance, determine that an end-user input is required for generating the certificate, display a first graphical component that prompts an end-user for an input associated with generating the certificate, receive the input, and provide a request to generate the certificate based on the input;
   responsive to a determination that the certificate cannot be installed on the computing device without assistance, display a second graphical component that instructs the end-user to contact an administrator for assistance with installing the certificate;
   store the certificate in a certificate storage block for storing a plurality of certificates of the computing device, wherein the end-user of the computing device is prevented from modifying the plurality of certificates stored in the certificate storage block, and wherein the end-user of the computing device is prevented from copying the plurality of certificates stored in the certificate storage block to another computing device; and
   provide the certificate in response to a request to connect to the network.

17. The computer-readable medium of claim 16, wherein the first graphical component or the second graphical component is associated with a browser.

18. The computer-readable medium of claim 16, wherein the input associated with generating the certificate comprises one or more of an end-user identifier, a password, permission to access antivirus program information, or permission to access a virus scan history.

19. The computer-readable medium of claim 16, wherein causing the computer to store the certificate comprises causing the computer to store the certificate in an encrypted certificate storage unit on the computer.

20. A computing device comprising:
   one or more processors; and
   a memory comprising instructions that, when executed by the one or more processors, cause the one or more processors to:
     determine that a certificate associated with a network is not installed on the computing device;
     determine that end-user input is required to install the certificate based at least in part on a user setting;
     display a graphical component which prompts an end-user for an input associated with generating the certificate;

receive the input;

provide a request to generate the certificate based on the input;

receive the certificate, the certificate being encrypted;

store the certificate in a certificate storage block for storing a plurality of certificates of the computing device, wherein the end-user of the computing device is prevented from modifying the plurality of certificates stored in the certificate storage block, and wherein the end-user of the computing device is prevented from copying the plurality of certificates stored in the certificate storage block to another computing device; and provide the certificate in response to a request to connect to the network.

21. The computing device of claim 20, wherein the graphical component is displayed in one of a browser window, a browser tab, or a browser pop-up.

22. The computing device of claim 20, wherein the memory comprises a certificate storage unit, wherein causing the one or more processors to store the certificate comprises causing the one or more processors to store the certificate in the certificate storage unit.

23. The computing device of claim 22, wherein the certificate storage unit is encrypted.

24. The computing device of claim 20, wherein the input comprises a confirmation by the end-user of the computing device that the certificate is to be generated.

25. A computer-implemented method for connecting to a network, the method comprising:

receiving indicia of a set of available networks;

receiving, for each network in a subset of the set of available networks, an input indicating a set of certificates required to connect to the network and a certificate-obtaining application associated with the network for launching in a case where at least one certificate in the set of certificates is not available;

receiving a request to connect to a specified network in the subset of the set of available networks;

determining that the set of certificates required to connect to the specified network is not available;

determining whether the set of certificates can be obtained without assistance from an administrator;

responsive to determining that the set of certificates can be obtained without assistance from the administrator, executing the certificate-obtaining application associated with the specified network, wherein executing the certificate-obtaining application associated with the specified network comprises:

determining, via the certificate-obtaining application, that an end-user input is required to install the set of certificates, displaying, via the certificate-obtaining application, a graphical component which prompts an end-user for the end-user input required to install the set of certificates, and storing the set of certificates in a certificate storage block for storing a plurality of certificates of a computing device, wherein the end-user of the computing device is prevented from modifying the plurality of certificates stored in the certificate storage block, and wherein the end-user of the computing device is prevented from copying the plurality of certificates stored in the certificate storage block to another computing device; and generating a service request for the administrator to provide the set of certificates when the set of certificates cannot be obtained without assistance.

26. The method of claim 25, wherein the subset of the set of available networks comprises at least one WiFi network.

27. The method of claim 25, wherein the subset of the set of available networks comprises a virtual private network (VPN).

28. The method of claim 25, further comprising:

if the set of certificates required to connect to the specified network is not available, obtaining the set of certificates required to connect to the to the specified network via the certificate-obtaining application associated with the specified network, and connecting to the specified network with the set of certificates required to connect to the specified network.

29. The method of claim 25, further comprising:

providing a graphical user-interface element prompting the end-user to contact the administrator for assistance in obtaining the set of certificates required to connect to the specified network, when the set of certificates cannot be obtained without assistance.

30. The method of claim 25, wherein determining whether the set of certificates can be obtained without assistance from the administrator comprises determining whether the set of certificates can be obtained without assistance from the administrator based at least in part on at least one of an identifier associated with the specified network or login information of the end-user of the computing device.

\* \* \* \* \*

UNITED STATES PATENT AND TRADEMARK OFFICE
CERTIFICATE OF CORRECTION

PATENT NO. : 9,621,403 B1  
APPLICATION NO. : 13/412552  
DATED : April 11, 2017  
INVENTOR(S) : Sumit Gwalani et al.

Page 1 of 1

It is certified that error appears in the above-identified patent and that said Letters Patent is hereby corrected as shown below:

In the Specification

In Column 2, Line 54:  
Replace "to the to the specified network" with --to the specified network--.

In Column 2, Line 56:  
Replace "to the to the specified network" with --to the specified network--.

In Column 10, Line 8-9:  
Replace "to the to the specified network" with --to the specified network--.

In Column 10, Line 12:  
Replace "to the to the specified network" with --to the specified network--.

In the Claims

In Column 18, Line 28-29:  
Replace "to the to the specified network" with --to the specified network--.

Signed and Sealed this  
Twenty-seventh Day of August, 2019

Andrei Iancu  
*Director of the United States Patent and Trademark Office*